W. C. KERN.
AMBULANCE BODY.
APPLICATION FILED APR. 21, 1916.
1,192,211.
Patented July 25, 1916.
2 SHEETS—SHEET 1.
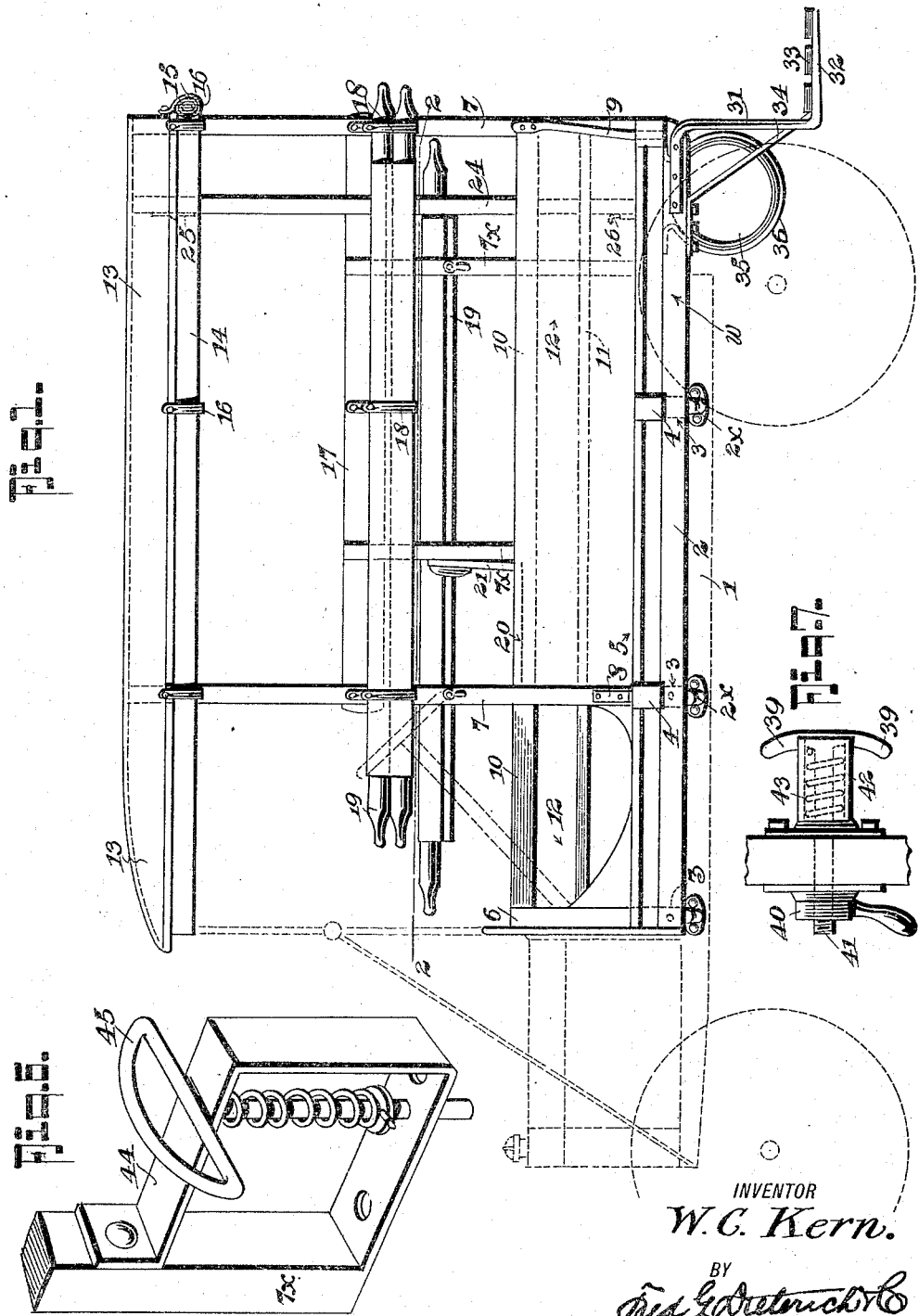
INVENTOR
W. C. Kern.
BY
Fred G. Dieterich & Co.
ATTORNEYS

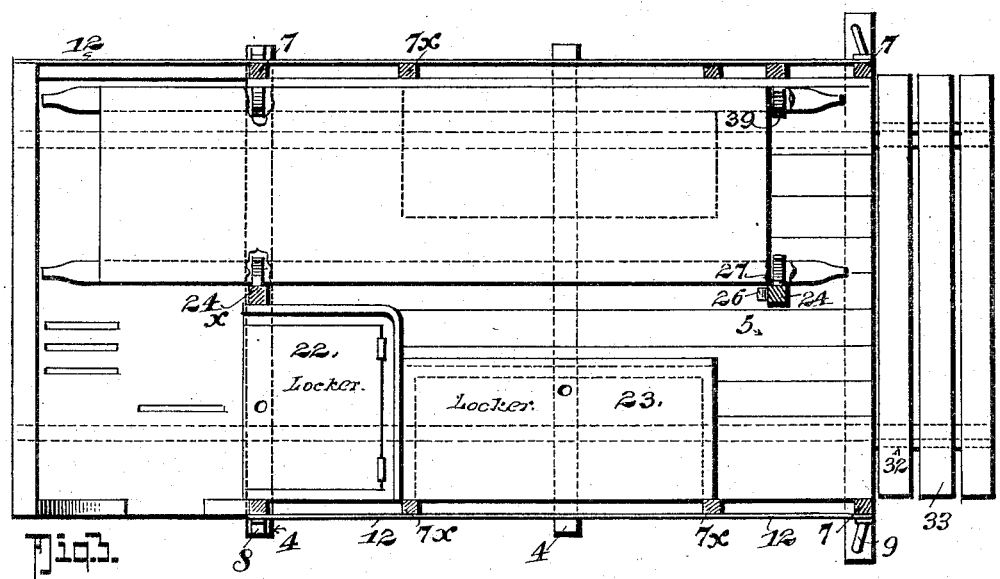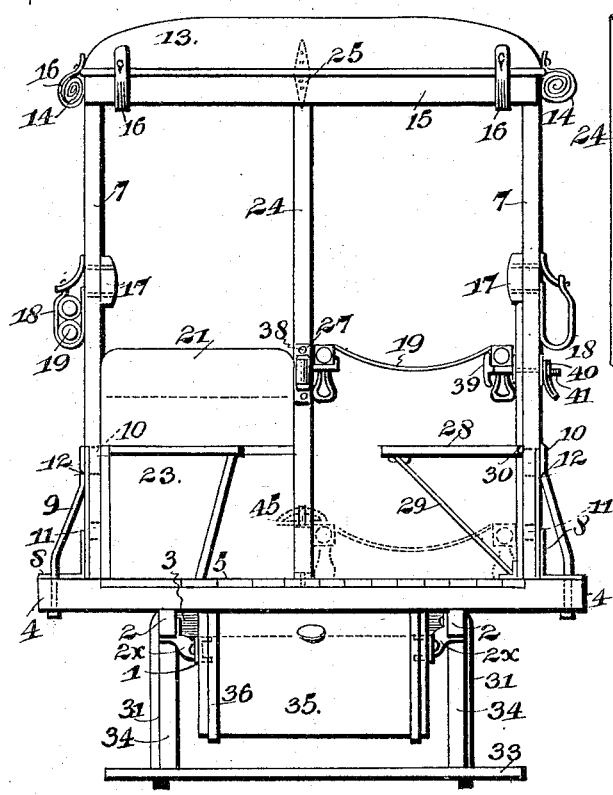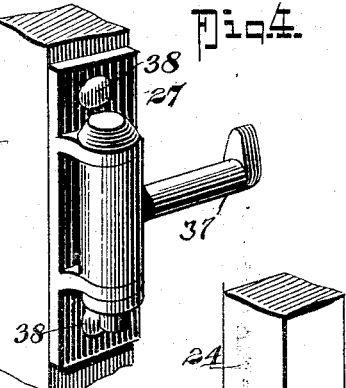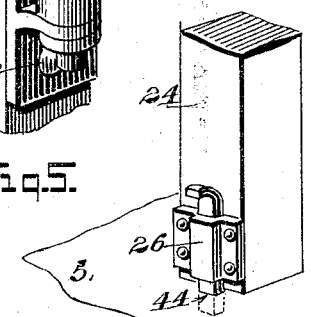

UNITED STATES PATENT OFFICE.

WALTER C. KERN, OF LEAVENWORTH, KANSAS, ASSIGNOR TO THE WM. G. HESSE & SON MFG. CO., INCORPORATED, OF LEAVENWORTH, KANSAS.

AMBULANCE-BODY.

1,192,211.  Specification of Letters Patent.  Patented July 25, 1916.

Application filed April 21, 1916. Serial No. 92,719.

*To all whom it may concern:*

Be it known that I, WALTER C. KERN, residing at Leavenworth, in the county of Leavenworth and State of Kansas, have invented certain new and useful Improvements in Ambulance-Bodies, of which the following is a specification.

My invention relates to certain new and useful improvements in the construction of ambulance bodies especially designed and adapted for use on the well-known Ford automobile chassis, and the invention primarily has for its object to provide an ambulance body and its coöperative parts that can be easily and securely mounted on a Ford chassis and in which the parts are so coöperatively arranged and designed as to effect an even and uniform distribution of the weight and provide as little over-hang at the rear as possible.

Another object of the invention is to provide an ambulance body in which the carrying capacity is regulated by the provision of only sufficient quarters for the predetermined load whereby to prevent over loading as is now common in the ordinary types of commercial bodies used on the Ford chassis.

Again, it is an object of the invention to provide an ambulance body for the purpose stated of as small dimensions as possible and as light weight possible, consistent with the requisite strength.

In its more subordinate aspects the invention provides an ambulance body having ample locker space for supplies of various kinds, and the invention also includes those novel details of construction, combination and arrangement of parts all of which will be first fully described, then be specifically pointed out in the appended claims and illustrated in the accompanying drawings, in which:—

Figure 1 is a side elevation of the invention applied to a Ford chassis frame, a portion of the chassis being indicated in dotted lines. Fig. 2 is a horizontal section of the invention on the line 2—2 on Fig. 1. Fig. 3 is a rear elevation of the same. Fig. 4 is a detail perspective view of one of the litter holders. Fig. 5 is a detail perspective view showing the manner of securing the hinge center post in the vertical position. Fig. 6 is a detail perspective view of one of the lower litter clamps. Fig. 7 is a detail elevation of the upper litter clamp.

Referring now to the accompanying drawings, in which like letters and numerals of reference indicate like parts in all of the figures, 1 indicates the chassis frame of the well-known Ford automobile and W represents the longitudinal frame beams of the body that constitutes my present invention.

The beams 2 are transversely connected at intervals by cross beams 3 and on top of the beams 2 the cross sills 4 are suitably fastened. The sills 4 support the side uprights 7, two of which are provided on each side of the vehicle and serve to support the ribbed top deck 13 which, in practice, is made up of hard wood slats covered with special water-proof duck. Short intermediate uprights $7^x$ are located on each side to support the lazy back 17 and litters 19.

8 represents the angle braces for the uprights 7, and 9 designates the braces for the rear uprights 7 which secure the same to the rear sill 4.

10 designates the upper rail of the body proper and 11 the intermediate rails. These rails support the sheet metal side panels 12, the rails 10 and 11 on the left hand or driver's seat of the vehicle terminating at the front uprights 7, while those on the right hand side extend clear to the dash-board fixture 6.

5 is the flooring which is made up of strips secured to the sills 4.

14 designates the side curtains and 15 the rear end curtains which may be rolled up and secured by straps 16, the curtains being permanently secured to the top 13 so that they can be easily let down.

17 is a lazy back which is secured to the uprights 7 and $7^x$ on the inside of the vehicle at each side, and 18 designates the litter racks for supporting the folding litters on the outside of the uprights 7 when the litters 19 are not in use, there being racks 18 provided on the uprights 7 at each side of the body.

20 is the operator's seat which is located on the left side of the body near the front and the space beneath the seat 20 is formed as a locker 22 in which tools, reserve gasolene, oils, greases, etc., may be carried.

21 is the back of the operator's seat, best shown in Fig. 1 of the drawing.

23 is a locker on the left hand side of the body directly behind the driver's seat. This locker has a hinged cover (see Fig. 2) and is in practice made of a length sufficient to serve as a seat for two persons only. In practice, the locker seat 23 is three feet long by about fourteen inches wide and directly opposite this locker on the right hand side of the vehicle is a folding seat 28 of substantially the same dimensions, which is hinged at 30 and may be folded up against the side of the body or extended out to serve as a seat (see Fig. 3) in which event a strut or brace 29 is provided to sustain the seat in the horizontal position.

24 is a center upright which is located near the rear of the vehicle to coöperate with the front corner strut 24× (Fig. 2) and divide the body into a right and a left hand section, as it were. The upright 24 is hinged at 25 to the top of the vehicle so as to be susceptible of being swung up forwardly and secured to the top out of the way when the litters are not employed, and the body is used for transporting persons not contained on litters. In order to secure the upright 24 to the vertical position, however, when such is desired, I provide a suitable catch 26 whose bolt is designed to enter an aperture 44 in the floor.

The construction of the litter hangers or supports is best shown in Fig. 4, by reference to which it will be seen that I have provided a bracket 27 which is secured at 38 to the post 24, and to which an arm 37 is hinged, on which arm the inside litter pole is designed to be set. The outside pole is held in place by a clamp member 39 whose rod 41 is held in a socket 42 and is drawn against the tension of a spring 43, by a wing nut 40. When it is desired to remove the litter, the clamp 39 is loosened by unscrewing the nut 40 so the spring 43 can force the clamp 39 outwardly to allow the poles to be detached.

The lower litter 19 is set with its feet resting on the floor and is clamped against longitudinal movement by the clamp shown in Fig. 6, by reference to which it will be seen a bracket 44 is fastened to the side post 7× and to the floor and carries a yieldable spring pressed T-bolt 45 that is adapted to engage the litter and hold it down.

31 designates angle brackets extended from the beams 2 at the rear of the vehicle and having platform supporting ends 32 on which the platform slats 33 are secured, the platform being braced by diagonal braces 34, as best shown in Figs. 1 and 3 of the drawings.

35 is the gasolene tank which is secured by straps 36 beneath the ambulance body at the over-hang or rear portion thereof.

In practice, it will be seen that by the employment of this body, two patients may be carried on litters at one side of the body, while two patients may be seated on the locker seat 23. This, together with the driver on the seat 22 will constitute five passengers, the normal carrying capacity of the Ford machine. By providing only the seats 23—28, capable of seating but two people, when the litters are not employed, there is but little danger of over-loading the vehicle. It will also be observed that ample provision is made for carrying hospital supplies and vehicle supplies and that the parts are so designed as to provide a well balanced arrangement which is especially adaptable for the Ford car.

In order that the body may be secured to the chassis, suitable brackets 2× are provided that extend from the longitudinal beams 2 to the chassis frame irons 1.

From the foregoing description taken in connection with the accompanying drawings, it is thought the complete construction, operation and advantages of my invention will be readily understood.

What I claim is:

1. In an ambulance body, longitudinal beams, brackets for securing said beams to the chassis frame of an automobile, cross sills on said beams, a flooring on said sills, side posts extending up from said sills, said longitudinal beams extending forwardly of the front pair of side posts, a top on said posts overhanging the front pair of side posts, a dash fixture on the front of said beams, side paneling structure extending from the back end of the bed to the dash on one side of the body and terminating at the front side post on the other side of the body, a front center post and a rear center post, a hinge connection between the rear center post and the top whereby said rear center post may be swung up against the top when not in use, means for securing the free end of said rear center post, litter carriers supported from said center posts and one side of the body, a driver's seat between the front side and center posts and extending rearwardly at one side of the central plane of the body.

2. In an ambulance body, longitudinal beams, brackets for securing said beams to the chassis frame of an automobile, cross sills on said beams, a flooring on said sills, side posts extending up from said sills, said longitudinal beams extending forwardly of the front pair of side posts, a top on said posts overhanging the front pair of side posts, a dash fixture on the front of said beams, side paneling structure extending from the back end of the bed to the dash on one side of the body and terminating at the front side post on the other side of the body, a front center post and a rear center post, the front center post being fixed, a hinge connection between the rear center post and the top whereby the said rear center post may be swung up against the top when not in use, means for securing the free end of said rear center post, litter carriers supported from said center posts and one side of the body, a driver's seat between the front side and center posts and extending rearwardly at one side of the central plane of the body, and a locker seat to the rear of the driver's seat.

3. In an ambulance body, longitudinal beams, brackets for securing said beams to the chassis frame of an automobile, cross sills on said beams, a flooring on said sills, side posts extending up from said sills, said longitudinal beams extending forwardly of the front pair of side posts, a top on said posts overhanging the front pair of side posts, a dash fixture on the front of said beams, side paneling structure extending from the back end of the bed to the dash on one side of the body and terminating at the front side post on the other side of the body, a front center post and a rear center post, the front center post being fixed, a hinge connection between the rear center post and the top whereby said rear center post may be swung up against the top when not in use, means for securing the free end of said rear center post, litter carriers supported from said center posts and one side of the body, a driver's seat between the front side and center posts and extending rearwardly at one side of the central plane of the body, a locker seat to the rear of the driver's seat, and a foldable seat on the litter carrying side opposite said locker seat.

4. In an ambulance body, longitudinal beams, brackets for securing said beams to the chassis frame of an automobile, cross sills on said beams, a flooring on said sills, side posts extending up from said sills, said longitudinal beams extending forwardly of the front pair of side posts, a top on said posts overhanging the front pair of side posts, a dash fixture on the front of said beams, side paneling structure extending from the back end of the bed to the dash on one side of the body and terminating at the front side post on the other side of the body, a front center post and a rear center post, the front center post being fixed, a hinge connection between the rear center post and the top whereby said rear center post may be swung up against the top when not in use, means for securing the free end of said rear center post, litter carriers supported from said center posts and one side of the body, a driver's seat between the front side and center posts and extending rearwardly at one side of the central plane of the body, a locker seat to the rear of the driver's seat, lazy backs secured to said posts above said last named seats.

5. In an ambulance body, longitudinal beams, brackets for securing said beams to the chassis frame of an automobile, cross sills on said beams, a flooring on said sills, side posts extending up from said sills, said longitudinal beams extending forwardly of the front pair of side posts, a top on said posts overhanging the front pair of side posts, a dash fixture on the front of said beams, side paneling structure extending from the back end of the bed to the dash on one side of the body and terminating at the front side post on the other side of the body, a front center post and a rear center post, the front center post being fixed, a hinge connection between the rear center post and the top whereby said rear center post may be swung up against the top when not in use, means for securing the free end of said rear center post, litter carriers supported from said center posts and one side of the body, a driver's seat between the front side and center posts and extending rearwardly at one side of the central plane of the body, a locker seat to the rear of the driver's seat, a foldable seat on the litter carrying side opposite said locker seat, lazy backs secured to said posts above said last named seats.

6. In an ambulance body for automobile chassis, a bed adapted to be supported on the chassis frame of an automobile, side structures extending up from said bed, a top supported on said side structures, front and rear inside posts extended up from said bed and lying in the same longitudinal plane to divide said body into two sections, means for securing one of said inside posts to be folded up into the top or held vertically, as desired, litter hangers on one side of said side posts, and on the body side opposite thereto, a driver's seat at the side of the body opposite to the litter carrying section and a passenger's seat to the rear of the driver's seat.

7. In an ambulance body for automobile chassis, a bed adapted to be supported on the chassis frame of an automobile, side structures extending up from said bed, a top supported on said side structures, front and rear inside posts extending up from said bed and lying in the same longitudinal plane to divide said body into two sections, means for securing one of said inside posts to be folded up into the top or held vertically as desired, litter holders on one side of said side posts and on the body side opposite thereto, said litter holders being arranged in sets, one set being located above the other to secure a plurality of litters to one side of the mid-vertical longitudinal plane of the body, a driver's seat at the side of the body opposite to the litter carrying section, and a passenger's seat to the rear of the driver's seat.

8. In an ambulance body for automobile chassis, a bed adapted to be supported on the chassis frame of an automobile, side structures extending up from said bed, a top supported on said side structures, front and rear inside posts extended up from said bed and lying in the same longitudinal plane to divide said body into two sections, means for securing one of said inside posts to be folded up into the top or held vertically, as desired, litter holders on one side of said side posts, and on the body opposite thereto, a driver's seat at the side of the body opposite to the litter carrying section, a passenger's seat to the rear of the driver's seat, said seats including lockers.

9. In an ambulance body for automobile chassis, a bed adapted to be supported on the chassis frame of an automobile, side structures extending up from said bed, a top supported on said side structures, front and rear inside posts extended up from said bed and lying in the same longitudinal plane to divide said body into two sections, means for securing one of said inside posts to be folded up into the top or held vertically as desired, litter holders on one side of said side posts, and on the body side opposite thereto, a driver's seat at the side of the body opposite to the litter carrying section, a passenger's seat to the rear of the driver's seat, a foldable seat on the litter carrying side of the body opposite to said passenger's seat, and lazy backs above said passenger's seat and said foldable seat.

10. In an ambulance body for automobile chassis, a bed adapted to be supported on the chassis frame of an automobile, side structures extending up from said bed, a top supported on said side structures, front and rear inside posts extended up from said bed and lying in the same longitudinal plane to divide said body into two sections, means for securing one of said inside posts to be folded up into the top or held vertically as desired, litter holders on one side of said side posts and on the body side opposite thereto, said litter holders being arranged in sets, one set being located above the other to secure a plurality of litters to one side of the mid-vertical longitudinal plane of the body, a driver's seat at the side of the body opposite to the litter carrying section, a passenger's seat to the rear of the driver's seat, said seats including lockers, a foldable seat in the litter carrying section opposite to said passenger's seat, and lazy backs above said passenger's seat and said foldable seat.

11. In an ambulance body for automobile chassis, a bed adapted to be supported on the chassis frame of an automobile, side structures extending up from said bed, a top supported on said side structures, front and rear inside posts extended up from said bed and lying in the same longitudinal plane to divide said body into two sections, means for securing one of said inside posts to be folded up into the top or held vertically as desired, litter holders on one side of said side posts and on the body side opposite thereto, said litter holders being arranged in sets, one set being located above the other to secure a plurality of litters to one side of the mid-vertical longitudinal plane of the body, a driver's seat at the side of the body opposite to the litter carrying section, a passenger's seat to the rear of the driver's seat, said seats including lockers, a foldable seat in the litter carrying section opposite to said passenger's seat, lazy backs above said passenger's seat and said foldable seat and litter carriers on the outside of said body to sustain the folded litters when not in use.

12. In an ambulance body for automobile chassis, a bed adapted to be supported on the chassis frame of an automobile, side structures extending up from said bed, a top supported on said side structures, front and rear inside posts extended up from said bed and lying in the same longitudinal plane to divide said body into two sections, means for securing one of said inside posts to be folded up into the top or held vertically as desired, litter holders on one side of said posts and on the body side opposite thereto, said litter holders being arranged in sets, one set being located above the other to secure a plurality of litters to one side of the mid-vertical longitudinal plane of the body, a driver's seat at the side of the body opposite to the litter carrying section, a passenger's seat to the rear of the driver's seat, said seats including lockers, a foldable seat in the litter carrying section opposite to said passenger's seat, lazy backs above said passenger's seat and said foldable seat, litter carriers on the outside of said body to sustain the folded litters when not in use, curtains secured to the top for the sides and back of the body, said curtains adapted to be rolled up on the outside and means for securing said curtains in place.

13. In an ambulance body, longitudinal beams, brackets for securing said beams to the chassis frame of an automobile, cross sills on said beams, a flooring on said sills, side posts extending up from said sills, said longitudinal beams extending forwardly of the front pair of side posts, a top on said posts overhanging the front pair of side posts, a dash fixture on the front of said beams, side paneling structure extending from the back end of the bed to the dash on one side of the body and terminating at the front side post on the other side of the body, a front center post and a rear center post, the front center post being fixed, a hinge connection between the rear center post and the top whereby said rear center post may be swung up against the top when not in use means for securing the free end of said rear center post, litter carriers supported from said center posts and one side of the body, a driver's seat between the front side and center posts and extending rearwardly at one side of the central plane of the body, the body overhanging the rear end of the chassis frame, a gasolene tank secured to the body at the rear overhanging portion of the same, and a step or platform pendent from the rear end of the bottom.

14. In an ambulance body for automobile chassis, a bed adapted to be supported on the chassis frame of an automobile, side structures extending up from said bed, a top supported on said side structures, front and rear inside posts extended up from said bed and lying in the same longitudinal plane to divide said body into two sections, means for securing one of said inside posts to be folded up into the top or held vertically, as desired, litter hangers on one side of said side posts, and on the body side opposite thereto, a driver's seat at the side of the body opposite to the litter carrying section, a passenger's seat to the rear of the driver's seat, the body overhanging the rear end of the chassis frame, a gasolene tank secured to the body at the rear overhanging portion of the same, and a step or platform pendent from the rear end of the bottom.

15. In an ambulance body for automobile chassis, a bed adapted to be supported on the chassis frame of an automobile, side structures extending up from said bed, a top supported on said side structures, front and rear inside posts extended up from said bed and lying in the same longitudinal plane to divide said body into two sections, means for securing one of said inside posts to be folded up into the top or held vertically, as desired, litter hangers on one side of said side posts, and on the body side opposite thereto, a driver's seat at the side of the body opposite to the litter carrying section, a passenger's seat to the rear of the driver's seat, said litter hangers comprising fixed receiving brackets on which the litter poles are adapted to rest and releasable clamp members coöperating with said brackets to sustain said litter poles in place.

WALTER C. KERN.

Copies of this patent may be obtained for five cents each, by addressing the "Commissioner of Patents, Washington, D. C."